INVENTOR.
WILLIAM HENRY QUEDNAU,
DECEASED
BY IWANNA H. QUEDNAU, EXECUTRIX
Bacon & Thomas ATTORNEYS

INVENTOR.
WILLIAM HENRY QUEDNAU,
DECEASED
BY IWANNA H. QUEDNAU, EXECUTRIX

Bacon & Thomas
ATTORNEYS

Nov. 12, 1968    H. QUEDNAU    3,410,199
DEEP FAT FRYER WITH AUTOMATIC FILTRATION AND STORAGE MEANS
Filed Feb. 2, 1967    6 Sheets-Sheet 6

Fig. 14.

INVENTOR.
WILLIAM HENRY QUEDNAU, DECEASED
BY IWANNA H. QUEDNAU, EXECUTRIX

Bacon & Thomas
ATTORNEYS

United States Patent Office 3,410,199
Patented Nov. 12, 1968

3,410,199
DEEP FAT FRYER WITH AUTOMATIC FILTRATION AND STORAGE MEANS
Henry Quednau, deceased, late of Tampa, Fla., by Iwanna H. Quednau, executrix, Tampa, Fla., assignor to Food Research & Equipment Company, Tampa, Fla., a corporation of Florida
Filed Feb. 2, 1967, Ser. No. 613,681
20 Claims. (Cl. 99—403)

ABSTRACT OF THE DISCLOSURE

Deep fat fryer having a storage and closed circulating system for the cooking oil, including a storage tank and a heater tank for the cooking oil, both of which are completely filled to exclude air when the device is out of service. The system further includes a filter accessible through the bottom wall of the cooking pot, so that a filter element can be inserted and removed through an opening in the bottom of the cooking pot. A pump and a three-way control valve having a FILL, OPERATE and STORE position complete the system. Thermostats in the cooking pot set at 325° F. and 365° F. provide a choice of cooking pot temperatures. A heater thermostat maintains oil in the heater tank at a temperature of 395° F. to quickly restore any drop in the cooking pot temperature as cold food is introduced. A safety thermostat on the heater tank cuts out the entire electrical system if the oil becomes heated to 410° F. Elements on a control panel signal closure of the main switch, show when the pump motor is running, when current is being supplied in the heater tank, and an overheated condition of the cooking oil.

BACKGROUND OF THE INVENTION

*Field of the invention*

The present invention relates to deep fat fryers for use in lunch rooms, restaurants, hotels, institutions and the like for preparing cooking foods, such as french fried potatoes, onion rings, fish, scallops, chicken, etc.

*Description of the prior art*

This invention relates to improvements in a deep fat fryer of the general type disclosed in Martin Patent No. 3,210,193. While the device of the Martin patent represents a significant advance in the deep fat fryer art, it, like many other prior devices, is subject to the objection that considerable time is required to remove and store the oil from the cooking pot at the end of a day's run and to enable the cooking pot to be cleaned. Such storage involves the use of a separate container and/or accessory equipment, including a container, a siphon, or pump, for withdrawing the oil from the cooking pot and storing it in the container overnight. If siphon or pump equipment is not available, the oil must be dipped out of the cooking pot and poured into the container. Regardless of the manner in which the oil is removed from the cooking pot, it must be removed from the container and returned to put the cooking pot back into service.

All of the foregoing oil removal procedures require considerable time, are messy due to unavoidable spillage of oil, are dangerous to the cook because of possible scalding by the hot oil, present a fire hazard and, moreover, the temporary pump and siphon type of storage devices are expensive and themselves require cleaning and maintenance. In every instance the container, additionally, presents a storage problem in the kitchen.

While prior devices, including the Martin patent, include a filter for the cooking oil, the filters have not been readily accessible, and considerable time is wasted in disassembling a portion of the apparatus to gain access to the filter element to remove it and accumulated crumbs, food particles, etc., trapped in the filter during the course of the day's operation.

A further objection to certain prior deep fat fryers is that their design is such that the cooking time is long, resulting in substantial oil absorption by the food being cooked, and the life of the cooking oil is comparatively short due to deterioration of the cooking oil from excessive heating, "film burning," oxidation through contact with air, etc., which limited the useful life of the cooking oil to two or three days.

SUMMARY OF THE INVENTION

This invention relates to deep fat fryers primarily intended for use in lunch rooms, restaurants, hotels, institutions, etc., for cooking various food products. The present deep fat fryer is designed so that the temperature of the oil in the cooking pot is maintained uniform, resulting in a minimum of time required for cooking the food and also a minimum absorption of the cooking oil by the food with a consequent minimum make-up oil requirement.

One of the important features of the invention is an automatic storage and circulating system for the cooking oil, including a control valve, a storage tank, a heater tank and a pump. The pump is arranged to withdraw oil from the storage tank and to pump it through the heater tank to displaced heated oil therefrom into the cooking pot until the desired level of cooking oil is obtained in the cooking pot. After the cooking pot has been filled, circulation of the oil is continued from the cooking pot through the heater tank until the desired oil temperature is attained in the cooking pot. The cooking pot has nozzles through which the cooking oil is returned to the cooking pot, the nozzles being arranged so that they produce a turbulent rotary flow to flush the food particles, breading, etc., into the filter. The turbulence maintains a uniform temperature through the body of oil in the cooking pot and also brings the oil into intimate contact with all pieces of food in the cooking basket.

Thermostat controls in the cooking pot and in the heater tank automatically control the circulation pump and maintain the desired cooking oil temperatures. A filter continuously filters the cooking oil as it is being circulated. The filter includes a filter bowl accessible through the bottom of the cooking pot for removal and replacement of the filter element.

The control valve is operated by a single control handle manually actuatable to a FILL position to effect filling of the cooking pot with cooking oil; actuatable to an OPERATE position for continuous circulation of the cooking oil through the cooking pot and heater tank to maintain the oil in the cooking pot at either a desired HI or LO cooking temperature; and actuatable to a STORE position to quickly empty the cooking pot and store the cooking oil in the storage tank.

The storage and circulating system is so designed that the storage tank and heater tank are disposed below the level of the filter bowl and are completely filled with oil when the cooking pot is completely drained. The cooking oil is thus kept out of contact with air when the fryer is not in use, thus avoiding oxidation of the cooking oil and prolonging the life thereof. The continuous filtering of the cooking oil to remove breading and food particles from the oil before the oil reaches the heater tank, avoids carbonizing of such particles, thus also attributing to prolonged cooking oil life.

A cover may be used and positioned over the cooking pot during the day to further reduce contact of the cooking oil with the atmosphere. Oxidation and prolonged life of the cooking oil can also be obtained by introducing an anti-oxidant into the cooking oil, introducing an inert gas into the oil to remove oxygen and produce an inert atmosphere above the cooking oil. A small amount of water can also be introduced into the cooking oil to form a trapped atmosphere of steam above the cooking oil and thus further decrease oxidation and extend the life of the cooking oil.

The principal object of the invention is to provide an automatic, self-contained deep fat fryer unit that is capable of filtering, storing, circulating, and heating the cooking oil under conditions least conductive to oxidation of the cooking oil, and hence, capable of extending the useful life of the cooking oil.

Another object is to provide a deep fat fryer capable of cooking foods in half or less than half the time required with previous devices.

Another object is to provide a deep fat fryer designed so that there is no carry-over of odor or taste of one food product to another by the cooking oil.

Another object is to provide a deep fat fryer unit wherein the cooking pot can be selectively and automatically either filled, maintained full, or drained, simply by adjusting a single control handle.

Another object is to provide a deep fat fryer unit that will eliminate the usual waste of time involved in removing and storing the cooking oil.

Another object is to provide a deep fat fryer unit wherein overheating of the cooking oil is automatically prevented, thereby avoiding the hazard of fire, and breakdown of the cooking oil that would otherwise result from excessive heating.

Another object is to provide a deep fat fryer unit that will be automatically and completely cut out of operation in the event that the cooking oil exceeds a predetermined safe temperature.

Another object is to provide a deep fat fryer unit having a filter that continually filters the oil, and which is readily accessible for removal and replacement of the filter element.

Another object is to provide a deep fat fryer unit wherein the cooking oil that is in contact with the heating element is continually agitated and circulated within the heating tank so as to avoid excessive local heating and film burning of the oil and thus prolong the useful life of the cooking oil.

Another object is to provide a deep fat fryer unit wherein the cooking oil is maintained in a condition of turbulence so that deposits of gum, etc., do not form on the side walls of the cooking pot, and wherein cooking oil can be pumped into the cook pot as it is being emptied, in order to flush away any food particles resting on the bottom of the cooking pot, thereby reducing clean-up work to a minimum.

Other objects and advantages of the invention will be apparent from the accompanying drawings and description of the invention appearing hereinafter.

BRIEF DESCRIPTION OF THE DRAWINGS

FIG. 9 is a horizontal sectional view taken on the line 9—9 of FIG. 4;

DESCRIPTION OF THE PREFERRED EMBODIMENT

Referring to FIGS. 1, 2, 3 and 9 of the drawings, the deep fat fryer unit is generally identified by the numeral 1 and has a cabinet 2 made from sheet, stainless steel, including a front panel 4 having rearwardly directed flanges 6 along its vertical edges. The cabinet 2 further comprises a single sheet of stainless steel bent to form a left side wall 8, a right side wall 10 and a rear wall 12. The front wall flanges 6 overlap the forward edges of the side walls 8 and 10, as is best shown in FIG. 9, A unitary stainless steel top 14 has a reversely bent side wall 16, FIG. 6, that fits over the top edge of the wall 8 and a similar reversely bent side wall 18 that fits the upper edge of the wall 10; a reversely bent rear wall 20 that fits over the upper edges of the wall 12.

The top 14 includes an apron 22 that extends inwardly from the sides 16, 18 and rear wall 20, and merges with a depressed portion forming a cooking pot 24. An inclined apron portion 26, FIG. 5, extends rearwardly from the front edge 28 of the top 14 to the cooking pot 24 to facilitate drainage of oil back into the cooking pot. The side walls 16 and 18 are interconnected by a rod 30 welded thereto, which provides a holder for a conventional wire cooking basket 32, for maintaining the same elevated when not in use.

Figure 6:
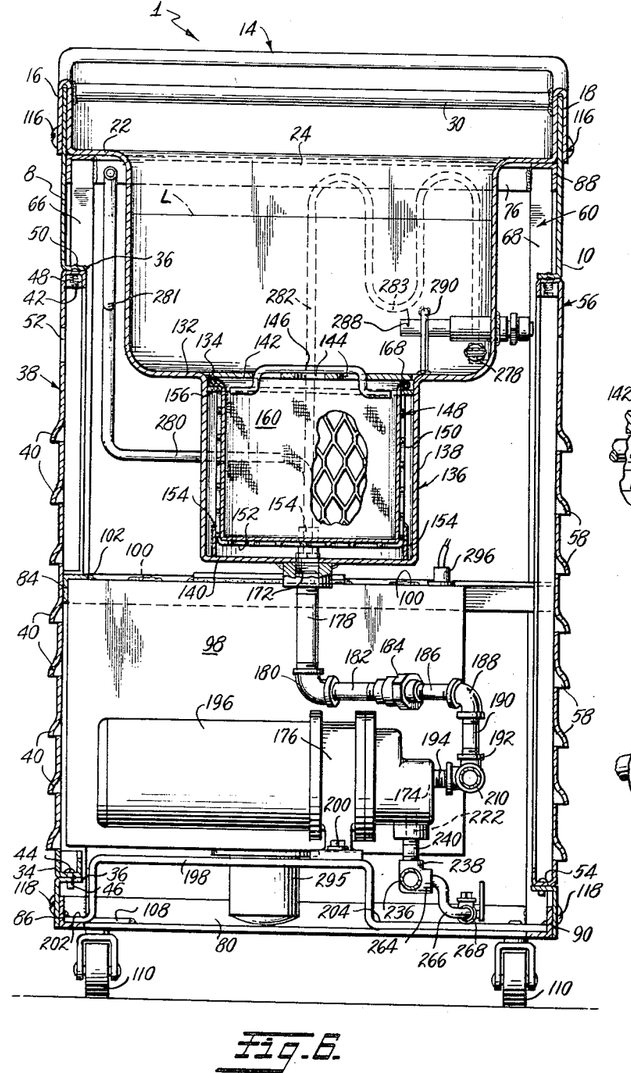
FIG. 6 is a vertical sectional view through the cabinet, cooking pot and filter bowl, taken on the line 6—6 of FIG. 4.

The side wall 8 of the cabinet 2 has an opening 34, FIGS. 6 and 9, defined by an inwardly turned flange 36, which receives a removable panel 38 having heat vent louvers 40. The peripheral edges of the panel 38 are bent inwardly and form a channel 42 to stiffen the same. The lower edge of the panel 38 has a pair of pins 44 that are received in openings 46 in the inturned flange 36 of the side wall 8 for retaining the lower edge of the panel 38 in place. The upper channel of the panel 38 has a pair of spring-pressed ball detents 48 mounted therein, which engage suitable depressions 50 in the flange portion 36 to detachably hold the upper edge of panel 38 in place. A pair of finger holes 52 is formed in the panel 38 so that the upper edge of the panel can be pulled free to effect removal thereof. The side wall 10 has an opening 54 in which a side panel 56, similar to the side panel 38 is detachably mounted in the same manner as the panel 38. The panel 56 also has louvers 58 to permit the heat from the interior of the cabinet 2 to escape when the device is in use, and finger holes 59 to facilitate removal of the panel from the cabinet.

Figure 10:
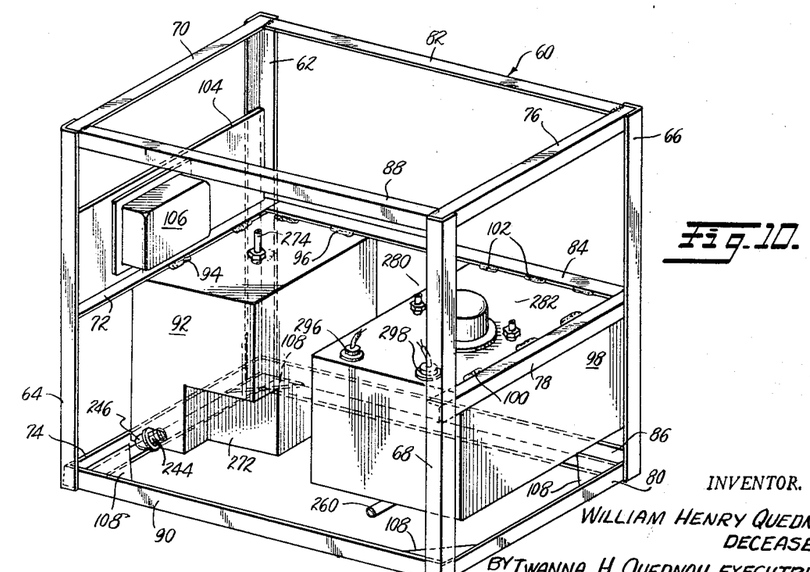
FIG. 10 is a perspective view of the skeleton frame of the device with the oil storage tank and the oil heater tank mounted thereon.

FIG. 10 illustrates a skeleton frame 60, which is enclosed by the cabinet front panel 4, side walls 8 and 10, and rear wall 12, as shown in FIG. 9. The frame 60 is constructed from angle iron sections preferably welded together to form a rigid frame structure. Thus, the frame 60 comprises vertical corner members 62 and 64 located at the front of the unit, and vertical corner members 66 and 68 located at the rear of the unit. The front angle irons 62 and 64 are interconnected by an upper transverse angle iron 70, and intermediate angle iron 72 and a lower angle iron 74. The rear upright angle irons 66 and 68 are similarly connected by transverse angle iron members 76, 78 and 80. The vertical angle irons 62 and 66 are interconnected by a longitudinal upper angle iron 82, an intermediate angle iron 84, and a lower angle iron 86. The vertical angle irons 64 and 68 are interconnected at their upper end by a longitudinal angle iron 88, and at their lower end, by an angle iron 90.

Figure 1:
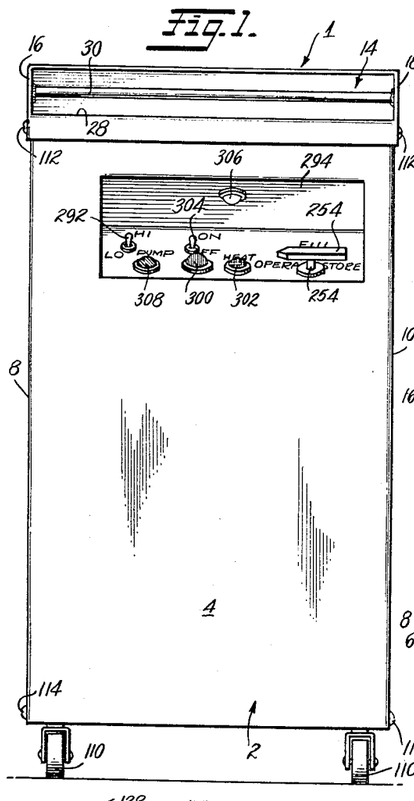
FIG. 1 is a front elevational view of the deep fat fryer device of the present invention.
Figure 3:
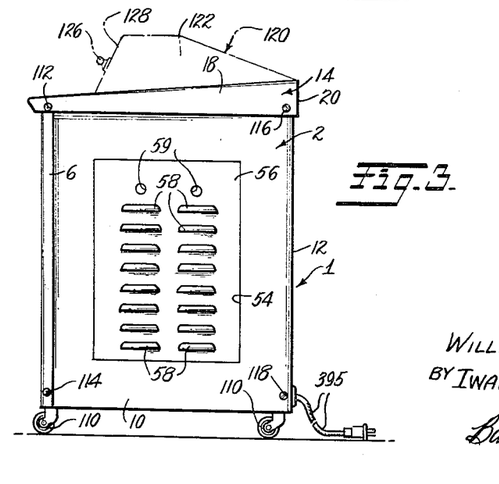
FIG. 3 is a right side elevational view of the fryer, particularly showing the removable side panel.
Figure 4:
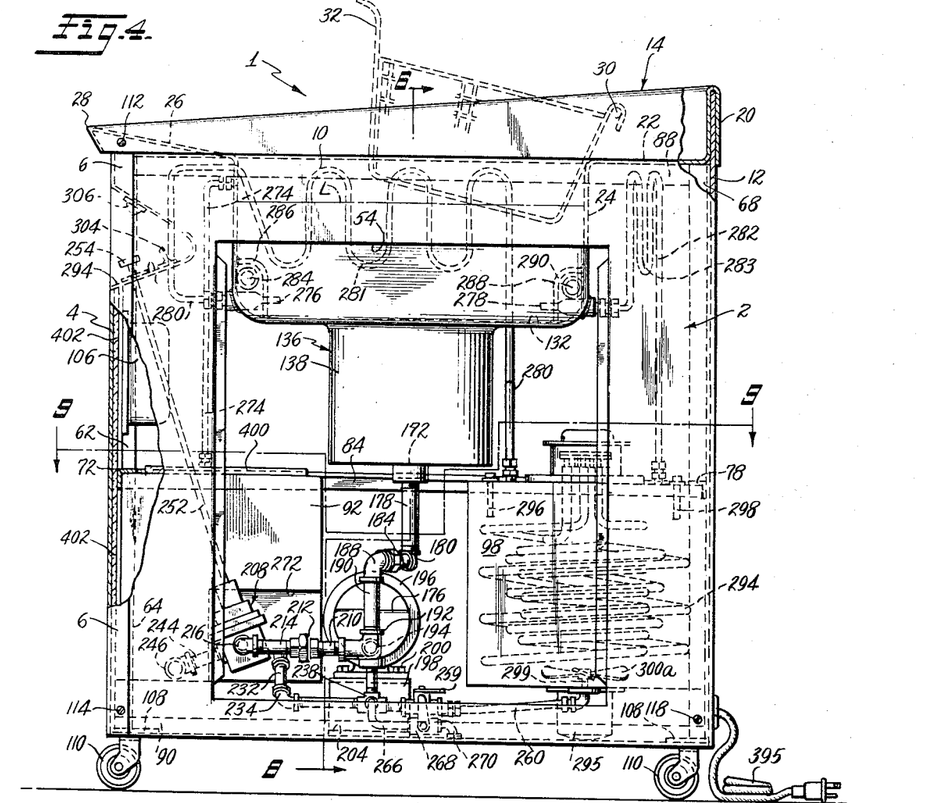
FIG. 4 is an enlarged right side elevational view of the fryer, showing a portion of the cabinet wall broken away and the side panel removed to reveal the parts in the interior of the cabinet.

The frame 60 serves as a support for a cooking oil storage tank 92 spot-welded at 94 to the intermediate front angle iron 72, and at 96 to the intermediate side angle iron 84. The frame 60 also serves as a support for a cooking oil heating tank 98, spot-welded at 100 to the rear intermediate angle iron 78 and at 102 to the intermediate side angle iron 84. It will be understood that the tanks 92 and 98 can be detachably mounted in the frame 60, if desired. The heater tank 98 is covered with insulation which has been omitted from the drawings to facilitate illustration of the elements associated therewith. A plate 104 is welded to the front angle irons 62 and 64 above the transverse angle iron 72 and serves as a support for a relay diagrammatically shown at 106, and which will be described in further detail later. The frame 60 is stiffened by triangular-shaped gusset plates 108 welded in place at each lower corner of the frame. Caster wheels 110, FIGS. 1, 3 and 4, are secured to the gusset plates 108 to render the fryer mobile.

As will be apparent from FIG. 9, the cabinet wall sections 4, 8, 10 and 12 completely surround and enclose the frame 60. The flanges 6 of the front wall 4 and the underlying edges of the side walls 8 and 10 are secured to the top 14 by screws 112 and to the vertical angle sections 62 and 64 of the frame 60 by screws 114, FIGS. 1 and 4. The side walls 8 and 10 are connected with the rear portion of the top 14 by screws 116, and the side walls 8 and 10, and rear wall 12, are securely fastened to 66 and 68, respectively, by screws 118. Thus, the cabinet 2, comprising the top 14, the front panel 4, and the side walls 8 and 10, and rear wall 12, is securely fastened to the skeleton frame 60.

Figure 5:
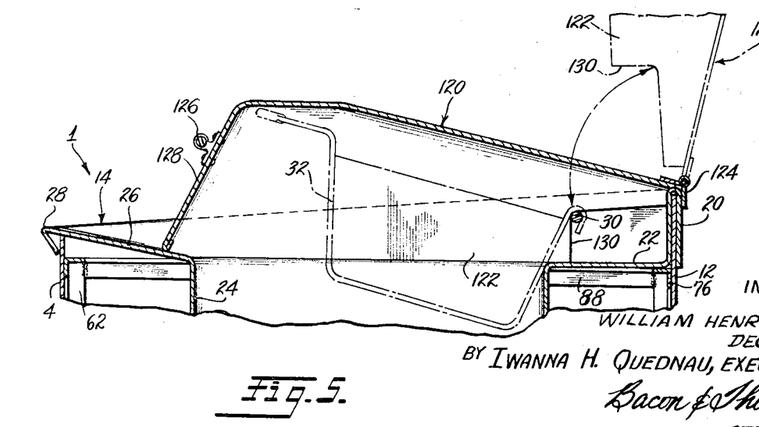
FIG. 5 is a fragmentary sectional view of the upper portion of the fryer showing an optional cover that can be used to enclose the top of the cooking pot.

Referring to FIG. 5, the cooking pot 24 may be enclosed by a stainless steel cover 120, comprising side walls 122, closely adjacent the side walls 16 and 18 of the top 14 when the cover is in the closed position, shown in full lines. The cover 120 is connected by a piano-type hinge 124 to the rear wall 20 of the top 14. An insulated handle 126 is secured to a front wall 128 of the cover 120 so that the cover can be raised to the position indicated by the dot-and-dash lines in FIG. 5, thus affording access to the wire basket 32. The side walls 122 of the cover 120 are notched as shown at 130 in order to clear the basket support rod 30. It will be understood that the lower edge of the side walls 122 and of the front wall 128 of the cover 120 press upon the apron portions 22 and 26 surrounding the cooking pot 24 to thus shield cooking oil in said pot from exposure to the atmosphere, to thereby reduce oxidation of the cooking oil. The cover 120 is optional and is shown in use in dot-and-dash lines in FIG. 3.

Figure 2:
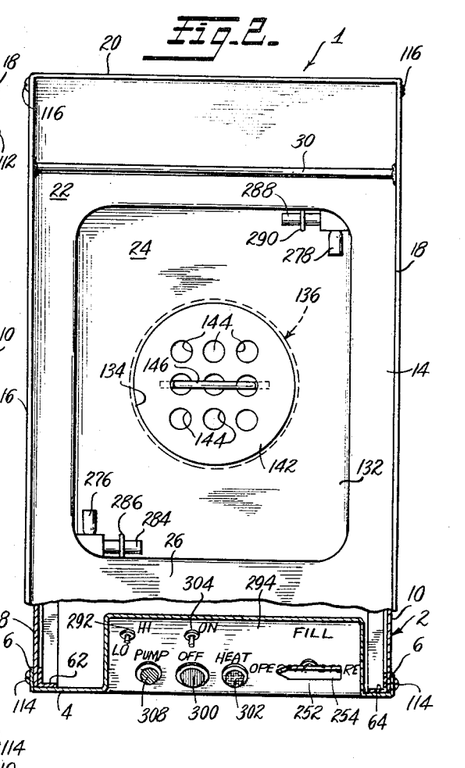
FIG. 2 is a plan view of the device shown in FIG. 1, with a portion of the top and front wall broken away to better illustrate the control panel.

Referring now to FIGS. 2 and 6, the cooking pot 24 has a bottom wall 132 with a circuit opening 134 leading to a filter bowl 136 comprising a cylindrical side wall 138 and a flat bottom wall 140. The opening 134 is closed by a cover 142 in the form of a circular plate having a series of openings 144, and a handle 146 extending through two of said openings to facilitate removal of said cover.

Figure 7:
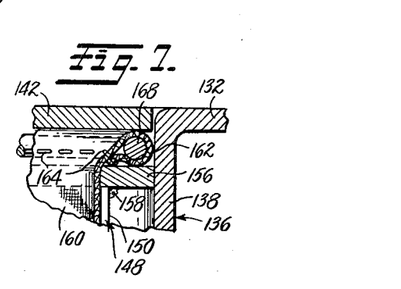
FIG. 7 is an enlarged fragmentary view illustrating the manner in which the filter bag is mounted in the filter bowl.

The filter bowl 136 contains a perforate filter basket 148 made from expanded metal and comprising a cylindrical side wall 150, to the lower edge of which is welded a circular bottom wall 152 also made from expanded metal. Four legs 154 are welded to the filter basket 150 to maintain the bottom wall 152 thereof spaced from the bottom wall 140 of the filter bowl 136. A ring 156 having an outside diameter slightly less than the inside diameter of the filter bowl side wall 138, and an inner diameter equal to the inner diameter of the side wall 150 of the filter basket 148, is welded to the upper edge of the filter basket as indicated at 158, FIG. 7.

Figure 8:
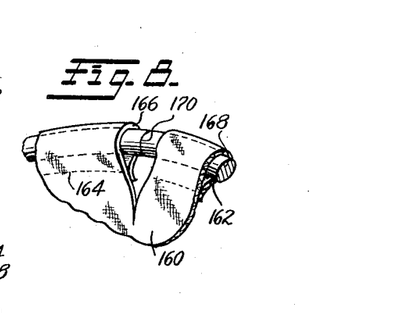
FIG. 8 is a fragmentary perspective view of the hem on the filter bag, which is threaded onto a split, spring wire retainer ring.

A fabric filter bag 160, preferably made from fibrous material known as "Osnaburg," is shaped to conform to the side and bottom walls of the filter basket 148, and has a hem 162 at its upper edge sewed by stitching 164. The hem 162 is slit at one point 166, as shown in FIG. 8, so that it can be threaded onto a retainer ring 168, which is split at 170. The retainer ring 168 is made of resilient material and of a diameter to be snugly received in the filter bowl 136 with its ends close together and tending to expand outwardly. The filter bag 160 has a neat fit in the filter basket 148, as shown in FIG. 6, and when in use, the hem portion 162 containing the retainer ring rests upon the ring 156 to maintain the filter bag in place within the filter basket. The ring 168 urges the hem 162 of the filter bag into close contact with the surrounding side wall 138 of the filter bowl 136 to form a seal therewith. After the filter bag 160 has been mounted in place as described above, the filter bowl cover 142 is placed in position to close the opening 134. It will be understood that oil from the cooking pot 24 readily flows into the filter bowl 136 through the openings 144 in the filter bowl cover 142.

Figure 11:
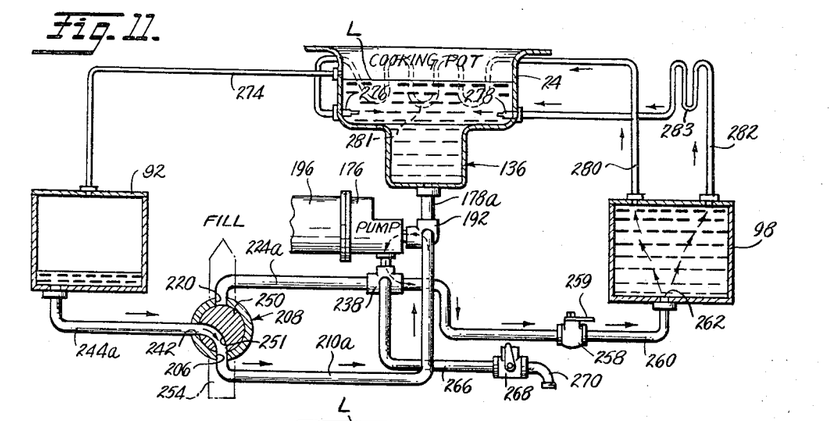
FIG. 11 is a diagrammatic view illustrating the flow system for the cooking oil with the control handle in the FILL position to effect filling of the cooking pot.

The bottom wall 140, FIG. 6, of the filter bowl 136 has an outlet 172 connected with the inlet 174 of a pump 176 by a pipe nipple 178, an elbow 180, a pipe nipple 182, a union 184, a pipe nipple 186, an elbow 188, a pipe nipple 190, a three-way fitting 192, and a short pipe nipple 194. It will be understood that a single conduit may be used to connect the filter bowl outlet 172 with the three-way fitting 194, in lieu of the several pipe fittings described above, for example, a conduit 178a, as shown in FIG. 11.

The pump 176 is conventional and has an electric motor 196 assembled with it to provide a combined motor and pump unit. The pump 176 is mounted upon a bracket 198, FIG. 6, by bolts 200. The bracket 198 has a horizontal end portion 202 that rests upon the angle iron 86 and another horizontal end portion 204 that rests upon the angle iron 90. The end portions 202 and 204 of the bracket 198 may be bolted or welded in position, as desired. Thus, the combination pump and motor 176–196 is securely mounted within the skeleton frame 60.

Referring to FIG. 9, the motor-driven pump 176 is located approximately midway of the length of the frame 60 so that it is disposed between the oil storage tank 92 and the oil heater tank 98. Both tanks are preferably fabricated from stainless steel sheet material and all juncture points of the plates are welded so that the possibility of leakage of oil is eliminated. The manner in which the pump 176 is interconnected with the storage tank 92 and the heater tank 98, and with the valve which controls the filling and draining of the cooking pot 24, will now be described.

The three-way fitting 192 connected with the pump inlet 174, is connected to one port 206, FIG. 9, of a conventional three-way control valve 208, by a pipe nipple 210, a union 212, a pipe nipple 214, an elbow 216, and a pipe nipple 218. Here, again, it will be understood that the three-way fitting 192 can be directly connected with the port 206 by a single conduit, if desired, such as the conduit 210a in FIG. 11. Diametrically opposite the port 206 is another port 220 in the control valve 208, connected with the outlet 222, FIGS. 6 and 9, of the pump 176 by a pipe nipple 224, an elbow 226, a pipe nipple 228, an elbow 230, a pipe nipple 232, an elbow 234, a pipe nipple 236, a T-fitting 238, and a pipe nipple 240. Here, again, it will be understood that the port 220 of the control valve 208 can be connected with the T-fitting 238 at the outlet port 222 of the pump 176 by a single conduit, such as the conduit 224a, FIG. 11, in lieu of several pipe fittings described above.

The control valve 208 has a third port 242, FIG. 9, which is connected to the oil storage tank 92 at the bottom thereof by a pipe nipple 244, an elbow 246 and another pipe nipple 248. A single conduit 244a could be used instead, as shown in FIG. 11. The control valve 208 includes a disc 250, shown diagrammatically in FIGS. 11, 12 and 13. The disc 250 has a port 251, and is rotated by a stem 252, FIG. 4, inclined from the vertical with a control handle 254 secured to its upper end.

The T-fitting 238 connected with the outlet 224 of the pump 176 is connected by a pipe nipple 256 with a plug-type valve 258 which, in turn, is connected by a tube 260 with an inlet 262 in the bottom of the heater tank 98. The plug valve 258 can be adjusted by a handle 259 to control the rate at which the pump 176 delivers oil to the heater tank 98 and, hence, the rate at which oil is pumped into the cooking pot 24, as will presently appear.

The T-fitting 238 has a side opening 264, FIG. 6, to which one end a drain pipe 266, containing a system drain valve 268, is connected. The valve 268 has an adapter 270 threaded therein to which a hose fitting (not shown) can be connected to drain cooking oil from the system. It will be noted from FIGS. 9 and 10 that the oil storage tank 92 has a recessed corner 272 to provide space for the pipe fittings 226, 228, etc., which connect the control valve 208 with the outlet 222 of the pump 176.

Referring to FIG. 4, one end of a vent tube 274 is connected with the top wall of the storage tank 92 and its other end is connected with the cooking pot 24 at a point above the maximum level of the oil in the cooking pot in order to avoid a vacuum condition in the storage tank 92 as oil is being withdrawn from said storage tank, to fill the cooking pot, as will be explained later. The tube 274 can also serve as an overflow if too much oil is let into the cooking pot 24.

Referring to FIGS. 2 and 4, oil is delivered to the cooking pot 24 through nozzles 276 and 278 mounted at diagonally opposite corners of the cooking pot adjacent the bottom wall 132 thereof. Oil from the heating tank 98 is delivered to the nozzle 276 through a tube 280 having one end connected with said nozzle and its other end connected to the top wall of said heater tank. Similarly, cooking oil is delivered to the nozzle 278 through a tube 282 having one end connected with the nodzle 278 and its other end connected with the top wall of the heater tank 98. The nozzles 276 and 278 direct the incoming oil into a circulatory path in the cooking pot 24.

Mounted in the cooking pot 24 adjacent the nozzle 276 is a thermostat 284 set to accurately maintain the cooking oil in the cooking pot at a prescribed LO temperature of 325° F., which temperature has been found to be best suited for blanching and cooking food items which are best cooked at about such temperature. The thermostat 284 is protected by a guard 286 against inadvertent damage by positioning of the cooking basket 32 in the cooking pot 24. A second thermostat 288 is mounted in the cooking pot adjacent the nozzle 278 and is similarly protected by a guard 290. The thermostat 288 is set to accurately maintain a constant HI temperature of 365° F. in the cooking pot 24, and which temperature has been found to be preferable for rapid cooking of certain food items.

The nozzle 276 and themostat 284, and the nozzle 278 and thermostat 288 are mounted in respective corners of the cooking pot for convenience and good appearance. However, it will be understood that the thermostats 284 and 288 can be mounted by themselves in diagonally opposite corners, and the nozzles 276 and 278 mounted in the remaining diagonally opposite corners.

With one thermostat and one nozzle mounted close together in the same corner of the cooking pot 24, provision is made to avoid any problem due to heat transfer through the oil in the tubes 280 and 282, between the heater tank 98 and the oil in the region of the nozzles 276 and 278, at times when the pump 176 is not running. In other words, to avoid any problem that might be created by response of the thermostats 284 and 288 to heat transferred from the oil in the heater tank 98 through the oil in the tubes 280 and 282 and causing local heating of the oil adjacent the nozzles 276 and 278 and the thermostats 284 and 288, rather than responding to the true temperature of the main body of oil in the cooking pot, when the pump 176 is idle.

Accordingly, each of the tubes 280 and 282 has at least one U bend, "thermal trap" in it, with the upper end of the legs of the U located above the height of the normal level L of the cooking oil in the cooking pot 24. More specifically, the tube 280 is shown with several traps 281; and the tube 282 is shown with a single trap 283, but could have more if desired. Thus, continuity of the oil in the tubes 280 and 282 is interrupted at the upper end of the legs of the traps so that heat cannot be conducted through a continuous stream of oil to the thermostats 284 and 288; which, therefor, respond only to the temperature of the oil in the cooking pot, and are not influenced by any extraneous higher heat conducted through the oil in the tubes 280 and 282.

The respective thermostats 284 and 288 can be selectively rendered operative at the option of the operator, by a switch 292 mounted on a control panel 294 recessed into the front wall 4 of the cabinet 2. As is shown in FIG. 2, the switch 292 has a LO position for activating the thermostat 284 and a HI position for activating the thermostat 288, thereby making it possible for the cook to pre-select the preferred pot temperature in accordance with the food to be cooked. The thermostats 284, 288 and the switch 292 are connected in an electrical circuit shown in FIG. 14, which will be described later.

The heater tank 98, FIG. 4, has electrically heated grid elements 294a mounted therein for maintaining the oil in said heating tank at a predetermined temperature. An electric motor 295 is mounted on the bottom wall of the heater tank 98 and has a shaft 299 to which is attached a blade 300a for continuously agitating and circulating the oil over the grid elements 294 in the heater tank 98 in order to prevent "film burning" of the oil by prolonged contact with the hot grids. The continuous circulation of the oil over the hot grids 294a avoids localized overheating and thus prolongs the useful life of the cooking oil.

The energization of the heating grid elements 294a is controlled by a heater thermostat 296 mounted in the top wall of the heater tank 98 and preferably set to maintain a uniform temperature of 395° F. in the reserve oil in the heater tank 98. A second, or safety thermostat 298, is also mounted in the top wall of the heater tank 98 and is set for a temperature of 410° F. The safety thermostat 298 is connected in the electrical circuit for the deep fat fryer unit so that in the event the heater thermostat 296 fails to cut off the supply of current to the heating grid elements 294a and the oil is heated to a temperature of 410° F., the entire electrical system to the fryer unit is cut off except for a red emergency signal lamp 300 mounted upon the control panel 294. The red light 300 serves as a warning to the cook that the heater is malfunctioning and that all operating current to the fryer unit has been cut off. The interruption of the supply of the electrical current to the grids 294a not only constitutes a safety feature for preventing excessive oil temperatures, but also prolongs the life of the cooking oil by preventing heating of the oil to temperatures high enough to effect decomposition and other deleterious effects on said oil. On the other hand, the 395° F. heater thermostat 296 is connected in circuit with a yellow signal light 302 on the control panel 294 to indicate that the electrical heating grids 294ª are in operation.

The control panel 294 also has mounted thereon a main switch 304 which, as indicated, has ON and OFF positions. A white light 306 mounted on the upper wall of the control panel 294 lights up whenever the main switch 304 is turned on. The switch 304 controls the motor 196 and also the supply of current to the heating grids 294ª. A green signal lamp 308 on the control panel 294 lights up whenever the pump motor 196 is in operation. The manner in which the various lamps and switches are interconnected will now be described in connection with the wiring diagram shown in FIG. 14.

Figure 14:
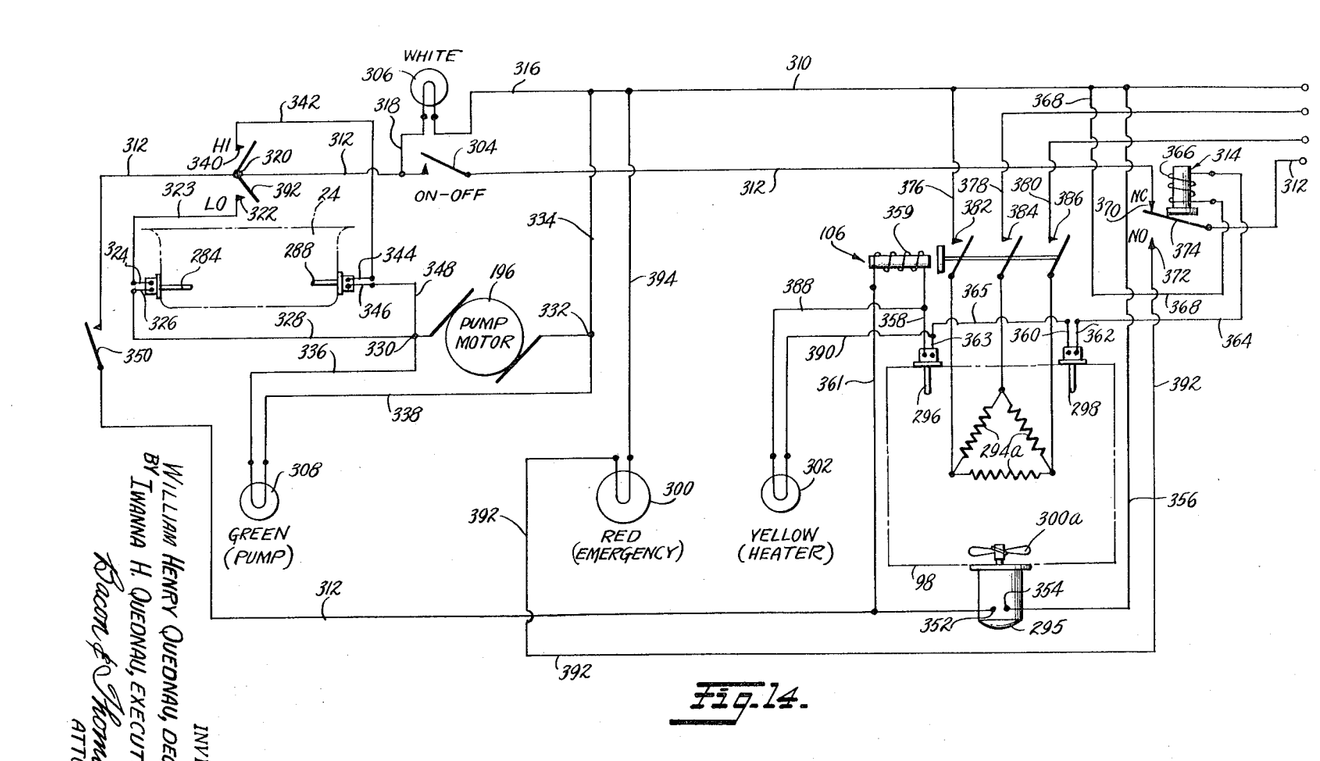
FIG. 14 is a schematic wiring diagram of the electrical circuit for the fryer.

Electrical current for operating the fryer unit 1 is supplied through two main conductors 310 and 312, the latter conductor having a relay 314 connected therein with a normally closed contact 370 so that current is supplied to the main switch 304. A white signal light 306 has one side thereof connected by a lead 316 with the conductor 310 and its other side connected by a lead 318 with the conductor 312 at a point beyond the switch 304. The conductor 312 extends to a common terminal 320 of the HI–LO switch 292. The switch 292 includes a LO contact 322 connected by a wire 323 with one lead 324 of the 325° F. cooking pot thermostat 284. The other lead 326 of the thermostat 284, is connected by a conductor 328 to a terminal 330 of the pump motor 196. The other terminal 332 of the pump motor 196 is connected by a wire 334 to the main conductor 310. The green signal light 308 is connected across the motor terminals 330 and 332 by leads 336 and 338.

The switch 292 also includes a HI contact 340 connected by a wire 342 with one lead 344 of the 365° F. cooking pot thermostat 288. The other lead 346 of the thermostat 288 is connected by a wire 348 with the terminal 330 of the pump motor 196.

Thus, when the main switch 304 is closed, the white signal light 306 will go on, and assuming that the switch 292 is in the LO position, current will flow from the conductor 312 through the switch 292, contact 322, wire 323, lead 324, thermostat 288, lead 326 and wire 328, to the motor terminal 330. The circuit to the motor is then completed through the wire 334 and main conductor 310. So long as the pump motor 196 is running, the green light 308 will be lighted. The thermostat 284 will keep the motor running, until the oil in the cooking pot 24 reaches a uniform temperature of 325° F. On the other hand, if the switch 292 is actuated to the HI position, current is supplied to the pump motor 196 through main conductor 312, switch 292, HI contact 340, wire 342, lead 344, thermostat 288, lead 346 and wire 348 to the motor terminal 330; the motor circuit being completed through the other motor terminal 332, wire 334 and conductor 310. The green signal light 308 will, of course, be on while the motor 196 is running. The thermostat 288 will maintain the pump motor 196 is operation until the cooking oil in the cooking pot 24 reaches a uniform temperature of 365° F.

The conductor 312 preferably has an optional heater control switch 350 connected therein, so that the supply of current to the heating grids 294ª can be manually interrupted without opening the main switch 304. The switch 350 would be infrequently used and therefore is located within the cabinet 2, instead of on the control panel 294. The conductor 312 is further connected to one terminal 352 of the agitator motor 295, the other terminal 354 of which is connected by a wire 356 to the main conductor 310 to complete the circuit to the motor 295.

The 395° F. heater thermostat 296, mounted on the heater tank 98, has one lead 358 connected with one of a relay coil 359, the other end of which is connected by a wire 361 to the main conductor 312. The other lead 363 of the heater thermostat 296 is connected by a wire 365 to the lead 360 of the 410° F. safety thermostat 298, which is also mounetd upon the heater tank 98. The other lead 362 of the thermostat 298 is connected by a wire 364 to one end of the coil 366 of the relay 314. The other end of the relay coil 366 is connected by a wire 368 to the main conductor 310. The relay 314 includes a normally closed (NC) contact 370 and a normally open (NO) contact 372. In normal operation, the relay 314 is closed while the heater circuit is operating and the relay armature 374 is in contact with the NC contact 370.

Electrical current of 220–240 volts is supplied to the heater grids 294ª in the heater tank 98 through a conductor 376 connected with the main conductor 310, and auxiliary conductors 378 and 380. The conductors 376 and 378 and 380 extend to relay contacts 382, 384, and 386, respectively. When the main relay coil 359 of the main relay 106 is energized, the circuit to the grids 294ª is completed, so that the grids become active to heat the oil in the tank 98. The yellow signal light 302 has one side connected by a wire 388 with the lead 358 of the thermostat 296, and its other side connected by a wire 390 with the other lead 363. So that so long as current is being supplied to the heater grids 294ª, the yellow signal lamp 302 will be lighted.

In the event that the heater thermostat 296 fails to function and deenergize the main relay 106 when the oil in the tank 98 reaches a temperature of 395° F., and the temperature of the oil continues to rise until it reaches a temperature of 410° F., the safety thermostat 298 will open the circuit and deenergize the relay 106 cutting off current to the heating grids 294ª, and also permitting the relay 314 to open the main circuit through the conductor 312. When this happens, the relay arm 374 will engage the normally open contact 372. This contact is connected by a wire 392 to one terminal of the red signal lamp 300, the other terminal being connected by a wire 394 to the other main conductor 310. Hence, when the circuit through the main conductor 312 is interrupted, due to excessive oil temperature, the circuit to the red emergency signal lamp 300 will be completed and current to all other electrical components of the system will be cut off. The red signal 300 will indicate to the operator that the oil in the tank 98 has been overheated and will serve as a danger signal to check the equipment. The conductors for supplying current to the Fryer unit 1 are contained in a cable 395, FIGS. 3 and 4.

It will be noted from FIG. 4 that the upper end of the oil storage tank 92 and the upper end of the heater tank 98 are disposed in the same horizontal plane, and that this plane lies slightly below the outlet of the filter bowl 136. The advantage of this arrangement is that the system can be filled with oil by pouring the same into the filter bowl 136 and both tanks 92 and 98 will be completely filled when the oil level rises to the bottom wall 140 of the filter bowl 136. As the cooking oil flows into the tanks 92 and 98, all air in the tank 92 is displaced through vent pipe 274, and all air in the tank 98 is displaced through the tubes 280 and 282. Thus, no air is present in the tanks 92 and 98, so that the cooking oil is protected from oxidation by the atmosphere.

The capacity of the oil storage tank 92 is preferably greater than that of the volume of oil required to fill the cooking pot 24 to the desired cooking level. The excess capacity of the tank 92 provides a convenient source of oil, if additional oil should be required during the day's operation of the fryer to restore the level of the cooking oil in the cooking pot 24 to the desired maximum level.

Assuming that the tanks 92 and 98 have been completely filled, as described above, the main switch 304 on the control panel 294 is moved to the ON position to complete the circuit to the pump motor 296 and to incidentally turn on the white signal light 306 to indicate that the main switch is turned on. The switch 296 is moved to the HI or LO position depending upon the cooking oil temperature desired in the cooking pot 24. Assuming further that the switch 292 is moved to the LO position, the 325° F. thermostat 284 will be cut into the control circuit, starting the pump motor 196 and simultaneously turning on the the green signal light. The control handle 254 is moved to its FILL position, which is indicated on the control panel 294, in order to effect filling of the cooking pot 24 with cooking oil.

Figure 12:
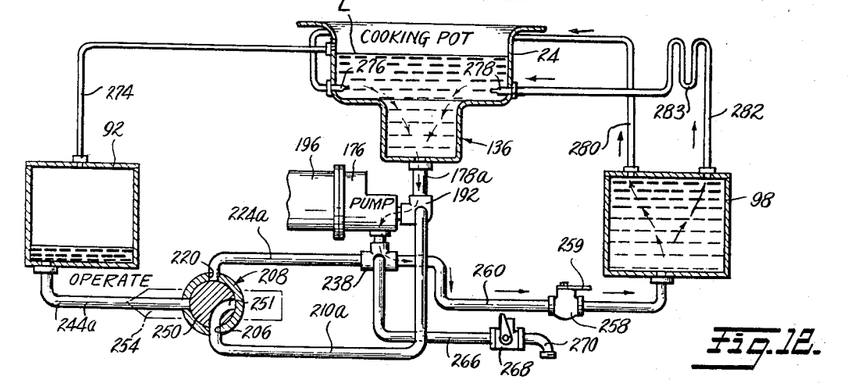
FIG. 12 is a view similar to FIG. 11, but showing the control handle in the OPERATE position corresponding to the normal use of the fryer, with continuous oil circulation.
Figure 13:
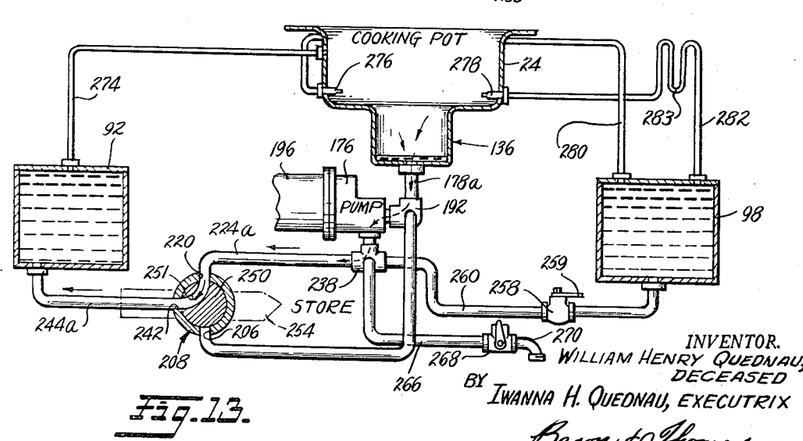
FIG. 13 is a view similar to FIG. 11, but showing the control handle in the STORE position to effect return of the cooking oil from the cooking pot to the storage tank.

FIGS. 11, 12 and 13 illustrate the principal components of the cooking oil storage and circulating system of the present fryer unit. For clarity in illustration, the filter basket 148 has been omitted from the filter bowl 136; and the heater grid elements 294a and oil circulating motor 295, shaft 299 and blade 300a have been omitted from the heater tank 98. Likewise, all thermostat controls have been omitted.

Referring to FIG. 11, when the control handle 254 is set at FILL, it positions the disc 250 of the three-way control valve 208 in a position such that the port 251 interconnects the conduits 244a and 210a, whereupon the pump 176 will withdraw oil from the storage tank 92 through the conduits 244a and 210a, and pump the same through conduit 260 and valve 258 into the bottom of the heater tank 98 from whence the oil already in the heater tank is displaced through the tubes 280 and 282 and discharged through the nozzles 276 and 278, respectively, into the cooking pot 24. The control handle 254 is permitted to remain in the FILL position until the level in the cooking pot reaches the desired height; whereupon, the handle 254 is moved to the OPERATE position to rotate the valve disc 250 90° counterclockwise to the position shown in FIG. 12. At this time, all flow of oil through the control valve 208 is completely blocked, but the pump 176 will continue to circulate the cooking oil by withdrawing it from the filter bowl 136 through the conduit 178a into the pump, and discharging the oil into the conduit 260 for flow through the heater tank 98 and return to the cooking pot 24.

It will be understood that the circulation of the oil through the closed system just described causes the oil to continuously pass over the heating grids 294a so that it becomes hotter as the circulation continues. The oil will continue to circulate until the temperature of the oil in the cooking pot reaches 325° F., whereupon the thermostat 284 will interrupt the circuit to the pump motor 196. When the device is first started and until the desired temperature of the cooking oil in the cooking pot 24 is uniform, there may be some cycling, that is, momentary turning on and off of the pump motor 196 until the desired uniform temperature in the cooking pot is attained.

Initial heating up of the cooking oil may require about 30 minutes, more or less, depending upon the B.t.u. output of the heater grids 294. The heater thermostat 296 will remain active until the reserve oil in the heater tank 98 reaches 395° F. The agitator blade 300a will continuously circulate the cooking oil over the heater grids 294a so that no part of the oil remains in contact therewith long enough to be "film burned." When the oil reaches 395° F., the yellow signal light 302 will go out, signaling the operator that the fryer is ready for use.

FIG. 12 diagrammatically indicates the continuous circulation of the oil that occurs during the normal operation of the fryer unit, that is, while higher-heated oil is being pumped from the heater tank 98 to the cooking pot 24 to maintain the desired constant cooking temperature. As is well known, food to be cooked in a fryer may have a temperature ranging anywhere from room temperature to minus 10° F., so that when such food is placed in basket 32 and lowered into the cooking pot 24, a large temperature drop will occur in the cooking oil. However, with the present apparatus, the instant that the temperature of the oil in the cooking pot 24 begins to drop below the desired constant cooking temperature, one or the other of the thermostats 284 or 288, depending upon which has been selected for control, will complete the circuit to the motor pump 196, with the result that oil at the higher temperature of 395° F. is immediately introduced into the cooking pot to restore the temperature of the cooking oil to the desired constant cooking temperature. Thus, as is shown in FIG. 12, the pump 176 will continuously withdraw oil from the filter bowl 136 through the conduit 178 and pump it through the conduit 260 to the bottom of the heater tank 98, thereby displacing oil at a temperature of 395° F. from the heater tank 98 and delivering it through the tubes 280 and 282, to the nozzles 276 and 278 in the cooking pot, whereby only a momentary temperature drop in the cooking oil occurs and continuous heat is rapidly supplied to replace that absorbed from the oil by the food. The quick recovery of the cooking temperature in the cooking pot 24 greatly lessens the amount of time required to properly cook the food. For example, French fried potatoes which normally require 3½ minutes can be cooked in 1½ minutes. The quick heat recovery in the cooking oil also results in less absorption of the oil by the food, because of the short period that the food is immersed in the oil.

With the present apparatus, the temperature drop of the cooking oil is very low because, almost the instant the relatively cold food is introduced into the 325° F. (or 365° F.) cooking oil, and the drop in temperature commences, the thermostat 284 (or 288) will function to complete a circuit to the pump motor 196, and the result will be an almost instantaneous surge of cooking oil at 395° F. from the heater tank 98 into the cooking pot 24, thus restoring the temperature of the cooking oil to the desired temperature in an extremely short period of time. It will be understood, of course, that the cooking oil is being continually sucked by the pump 176 through the filter bowl 136 to pump it through the closed circulating system described above.

The present fryer unit is designed so that the cooking oil can be withdrawn from the cooking pot 24 at any time, but normally at the end of a day's use of the fryer unit. Rotating the control handle 254 180° clockwise from the position shown in FIG. 12 to that shown in FIG. 13 will place the handle in the STORE position to effect draining of the cooking coil from the cooking pot 24 and its return to the storage tank 92.

Referring to FIG. 13, the control handle 254 is shown in its STORE position wherein the disc 250 of the control valve 208 is positioned so that the port 251 interconnects the valve ports 220 and 242 and blocks the port 206. With the pump 176 running, oil will be withdrawn from the filter bowl 136 through the conduit 178a and pump 176 and returned to the storage tank 92 through conduit 224a, valve port 251 and conduit 244a. At this time, no oil is pumped into the heater tank 98 because the oil follows the path of least resistance from the pump 176 and returns to the tank 92. If the pump 176 is not running because its then controlling thermostat is not and open, oil can drain by gravity from the cooking pot 24, through the pump, and find its way back to the storage tank 92.

When the cooking oil is at such temperature that the pump motor 196 is operating at the time that the control handle 254 is moved to the STORE position, the pump 176 will pump the oil out of the cooking pot in a fraction of a minute. If the unit has been turned off for a while, by opening the main switch 304, and neither pot thermostat 284 or 288 is effective, draining of the cooking pot can be effected by gravity when the control handle is moved to the STORE position. This may take two to three minutes of time, which is not objectionable, compared to the time required to remove and store the cooking oil in a separate container.

With the fryer unit turned off, that is, with the main switch 304 open so that the pump 176 will not operate, more rapid gravity return of the oil to the storage tank 92 can be effected by moving the control handle 254 to the FILL position shown in FIG. 11. Oil can then drain directly through the conduits 178a, fitting 192, conduit 210a, valve port 251, and conduit 244a, back to the storage tank.

Should it be desired to flush out the cooking pot 24 after the oil has drained out, and the main switch 304 has not been opened, the control handle 254 can be momentarily moved to its FILL position so that oil will be pumped into the cooking pot 24 in the form of jets issuing from the nozzles 276 and 278. These jets cooperate with the contour of the cooking pot 24 to produce a flow of oil in a rotary pattern at the bottom of the cooking pot, flushing out any crumbs or food particles that may have remained after the draining of the cooking pot. After the flushing operation has been completed, the control handle 254 is moved to the STORE position so that oil can be again completely drained back to the storage tank by pumping or by gravity. After the cooking pot 24 has been completely drained, the filter cover 142 is lifted from the opening 134 and the filter basket 148 is removed to clean or replace the filter bag 160.

If no oil is visible in the filter outlet opening 172, this will indicate that the storage tank 92 and heater tank 98 are not quite completely filled, and this condition can occur if enough cooking oil has been absorbed by the food during the day's run. Fresh oil is then poured into the filter bowl and drains off into the system by gravity. When the added oil begins to accumulate on the bottom 140 of the filter bowl 136, it indicates that the tanks 92 and 98 are completely filled, which is the ideal storage condition since all air will then have been forced out of both tanks.

The cooking pot 24 and the filter bowl 136 need only be wiped clean with a cloth or paper toweling, and the cooking pot is then ready for re-use. This simple expedient of cleaning is made possible by the fact that gum and other deposits are prevented from forming on the cooking pot walls by the continuous circulation of the cooking oil. The filter bag 160 can be replaced, or re-positioned in the filter basket 148, and the basket placed in the filter bowl 136 and covered by the plate 142. The apparatus is then in condition to be restarted, following the procedure of filling, etc., described above.

In view of the high temperature of the cooking oil returned to the storage tank 92, and in order to protect the relay 106 and other electrical components at the front end of the fryer unit from direct radiated heat, a heavy sheet of asbestos 400 is mounted upon the top of said tank, as shown in FIG. 4. Likewise, in order to avoid heating of the front wall 4 of the cabinet by the air in the cabinet heated by the heater tank 98, a heavy sheet of asbestos 402 is mounted between said wall and the frame 60, as shown in FIGS. 4 and 9.

In the event that it is desired to completely drain the oil from both tanks 92 and 98, a hose is attached to the fitting 270 and the drain valve 268 is open. However, one of the outstanding features of the present invention is that the cooking oil is maintained in such excellent condition for extremely prolonged periods of time, that draining of the cooking oil from the system would be required only at lengthy intervals.

In the use of the present invention, the filter removes all gums and solids and the cooking oil remains clear and devoid of films or cloudiness and can be used for long periods of time before it becomes unsuitable for use. This contrasts sharply with prior cooking devices in which the oil must be discarded at the end of each day or after several days, at most.

Actual tests of the present fryer unit have demonstrated the following capabilities:

(1) Overall savings in oil between 50 and 60%.
(2) Oil absorption by fried foods ran about one-third of the old method of deep fat frying.
(3) Time required to cook foods ran from one-half to one-third of the usual cooking time.
(4) The quality of the fried foods, as to appearance, color and taste was greatly improved.

It will be understood that the settings of the cooking pot thermostats 284 and 288 at 325° F. and 365° F., respectively, are preferable, but these can be varied within reason and satisfactory results still be obtained. This applies also to the settings of the heater thermostat 296 and the safety thermostat 298. The term "cooking pot" as used in the foregoing description and in the claims, means any container or zone in which food is to be cooked either in batches or continuously.

While a preferred embodiment of the invention has been illustrated and described herein, it will be understood that variations and changes may be made therein without departing from the principles of the invention or the scope of the annexed claims.

What is claimed is:

1. Apparatus for the deep fat cooking of foods, comprising: a cooking pot for receiving cooking oil and food to be cooked, said cooking pot having a wall with an opening therethrough; a filter bowl having an access opening in registration with said wall opening; and filter means for said cooking oil disposed in said filter bowl, said filter means being insertable into and removable from said filter bowl through said cooking pot opening.

2. Apparatus as defined in claim 1, in which the opening in the cooking pot is in the bottom wall thereof, and wherein the filter bowl is disposed below said bottom wall, and wherein said filter bowl has an outlet for filtered cooking oil, and wherein a perforate cover is provided for said filter bowl and extends across the opening in the bottom wall of said cooking pot.

3. Apparatus as defined in claim 1, wherein the filter means comprises a foraminous filter basket and a removable filter element disposed in said basket.

4. Apparatus as defined in claim 3, wherein the filter element is a fibrous member, and wherein means is provided to secure said fibrous member in position relative to said foraminous filter basket.

5. Apparatus as defined in claim 3, in which the filter basket has a foraminous side wall spaced from the filter bowl and a spacer ring fastened to the upper edge of said side wall bridging the space between said side wall and said filter bowl, and wherein the filter element is a porous bag having a hem with a retainer ring positioned in said hem and overlying the spacer ring at the upper end of the filter basket.

6. Apparatus as defined in claim 5, wherein the filter basket has a foraminous bottom wall, and wherein means is provided to space said foraminous bottom wall from the filter bowl.

7. Apparatus as defined in claim 3, in which the filter bowl has a cylindrical wall and a bottom wall, and wherein the filter basket is made from expanded metal and comprises a side wall of smaller diameter than said cylindrical wall; a ring fastened to the upper edge of said side wall, said ring having an outer diameter approximately equal to the inside diameter of said cylindrical wall of said filter bowl, and an inner diameter approximately equal to the inner diameter of the side wall of said filter basket; a bottom wall; and legs spacing said bottom wall of said filter basket from the bottom of said filter bowl.

8. Apparatus for the deep fat cooking of foods, comprising: a cooking pot for receiving cooking oil and food to be cooked, said cooking pot having a wall with an opening therethrough; a filter bowl having an inlet communicating with said cooking pot opening and having an outlet for filtered oil; filter means for said cooking oil disposed in said filter bowl; a heater tank for said cooking oil; means in said heater tank for heating said cooking oil, a vent tube connecting the upper end of said storage tank with said cooking pot; conduit means connecting the upper end of said heater tank with said cooking pot for delivering heated cooking oil from said heater tank to said cooking pot; a cooking oil pump; a control valve; and conduit means for said cooking oil interconnecting said control valve, pump, storage tank, heater tank and filter bowl outlet.

9. Apparatus as defined in claim 8, wherein the cooking pot has an opening in the bottom wall thereof, and wherein the filter bowl is disposed at the underside of the cooking pot and is generally cup-shaped with the open end thereof in registration with the opening in said bottom wall of said cooking pot, and wherein the filter means is insertable into and removable from said filter bowl through said cooking pot opening.

10. Apparatus as defined in claim 8, wherein the control valve has three ports and the conduit means connects: a first port of the control valve with the storage tank, a second port of the control valve with the outlet opening of the filter bowl and with the inlet of the oil pump, a third port of the control valve with the outlet of the cooking oil pump and with the inlet of the heater tank.

11. Apparatus as defined in claim 10, in which the upper end of the storage tank and the upper end of the heater tank are disposed in a plane below the filter bowl, and wherein both tanks are completely filled with cooking oil prior to filling of the cooking pot and also after the cooking oil has been returned from the cooking pot to the storage tank, whereby to exclude air from both tanks to minimize oxidation of the cooking oil.

12. Apparatus as defined in claim 8, wherein the control valve has: (1) a FILL position in which the cooking oil is pumped from the storage tank to the cooking pot; (2) an OPERATE position in which the cooking oil is continuously circulated between the heater tank and the cooking pot, and (3) a STORE position in which the cooking oil is returned from the cooking pot to the storage tank.

13. Apparatus as defined in claim 12, wherein the pump is driven by an electric motor, and wherein the cooking pot has a plurality of thermostats mounted therein set for different cooking temperatures and which are selectively connectable in circuit with the pump motor and arranged to complete a circuit to said motor to operate said cooking oil pump to circulate cooking oil through the heater tank and cooking pot when the control valve is in the OPERATE position and until the temperature of the cooking oil is in the cooking pot reaches the temperature for which the selected thermostat has been set.

14. Apparatus as defined in claim 13, including a signal means connected in circuit with the thermostats in the cooking pot and with the motor driving the oil pump, and which is actuated so long as the oil pump is operating.

15. Apparatus as defined in claim 8, in which the heater tank has electrically heated grid elements mounted therein for heating the cooking oil, and wherein a heater thermostat is mounted on the heater tank for controlling the supply of electrical current to the heater grid elements to maintain the oil in the heater tank at a predetermined uniform temperature substantially higher than the maximum desired cooking pot temperature, and wherein the conduit means delivering the heated oil to the cooking pot discharges the same thereinto through nozzle means that produce turbulent circulation of the cooking oil in the cooking pot.

16. Apparatus as defined in claim 15, wherein the heater tank has a motor-driven agitator mounted therein for continually circulating the cooking oil in said heater tank across the heater grid elements to prevent damage to the cooking oil by overheating and film burning of said cooking oil.

17. Apparatus as defined in claim 15, including signal means in circuit with the heater thermostat for producing a signal so long as electrical current is being supplied to the heater grid elements in the heater tank.

18. Apparatus as defined in claim 17 wherein emergency signal means is connected in circuit with the heater thermostat and safety thermostat and is actutable to indicate interruption of the circuit to the heater grid elements by said safety thermostat.

19. Apparatus as defined in claim 15, wherein the heater tank has a safety thermostat mounted thereon, set to operate at a given temperature higher than that of the heaer thermostat and arranged in circuit with the heater grid elements so that in the event said heater thermostat fails to function and the temperature of the oil in the heater tank exceeds the temperature for which the safety thermostat is set, the circuit to the heater grid elements will be interrupted by said safety thermostat.

20. Apparatus for the deep fat cooking of food, comprising: a frame; a cabinet enclosing said frame and having a cooking pot for receiving cooking oil and food to be cooked, said cabinet also having a control panel; an electrical circuit for controlling said apparatus comprising main conductors, a main switch mounted upon said control panel and connected with said conductors, and a first signal means connected across said main switch and responsive to closing of said main switch to indicate that the circuit to the apparatus has been completed; a storage tank for cooking oil, a motor-driven cooking oil pump, a heater tank for maintaining said cooking oil in a heated condition, and a control valve, all mounted upon said frame; conduit means interconecting said control valve, storage tank, pump and heater tank; thermostat means in said cooking pot preset to maintain the cooking oil in said cooking pot at a given uniform cooking oil temperature, said thermostat means being connected in circuit with said pump motor and arranged to complete the circuit to said motor whenever the temperature of the cooking oil in said cooking pot is below the said given cooking pot oil temperature; a second signal means mounted upon said control panel connected in said circuit with said cooking pot thermostat means and said motor for said pump and being actuated so long as said pump motor is operating; heating means in said heater tank connected in said circuit for heating said cooking oil; a heater thermostat mounted in said heater tank and connected in circuit with said heating means to maintain the oil in said heater tank at a substantially uniform maximum temperature higher than said given cooking oil temperature in said cooking pot; a third signal means mounted on said control panel connected in circuit with said heater thermostat and heating means and being responsive to produce a signal so long as electrical current is being supplied to said heating means; a safety thermostat mounted in said heater tank and connected in series with said first-mentioned heater thermostat and being set to operate at a higher temperature than the desired maximum oil temperature in said heater tank; a relay connected in said circuit and with said safety thermostat arranged so that in the event that said heater thermostat fails to function and said safety thermostat operates said relay, all current to the control circuit will be cut off; and a fourth signal means mounted upon said control panel and connected in said circuit with said relay to be operable upon opening of said relay to indicate that current to the control circuit has been interrupted because of excessive heating of the oil in said heater tank.

References Cited

UNITED STATES PATENTS 3,107,601   10/1963   Longmire         99—408 X
3,210,193   10/1965   Martin            99—403 X
3,280,722   10/1966   Rahauser        99—408 X ROBERT W. JENKINS, *Primary Examiner.*